United States Patent [19]
Hagon

[11] Patent Number: 6,076,454
[45] Date of Patent: Jun. 20, 2000

[54] APPARATUS FOR SEPARATING THE OUTER LAYERS OR SHELLS FROM THE INTERNAL SEED OF PLANT MATTER

[76] Inventor: Hunter Richard Hagon, P.O. Box 29, BANZ, Western Highlands Province, Papua New, Guinea

[21] Appl. No.: 09/068,902
[22] PCT Filed: Nov. 22, 1996
[86] PCT No.: PCT/AU96/00745
§ 371 Date: Jul. 24, 1998
§ 102(e) Date: Jul. 24, 1998
[87] PCT Pub. No.: WO97/18721
PCT Pub. Date: May 29, 1997

[30] Foreign Application Priority Data

Nov. 22, 1995 [AU] Australia .................................. PN6752

[51] Int. Cl.⁷ ............................... A23N 5/00; A23N 5/07; B02B 3/12
[52] U.S. Cl. .................... 99/519; 99/571; 99/570; 426/482
[58] Field of Search ......................... 99/519, 518, 570, 99/568, 571; 426/487, 482, 483

[56] References Cited

U.S. PATENT DOCUMENTS

| | | |
|---|---|---|
| 1,935,385 | 11/1933 | Biggs . |
| 2,759,511 | 8/1956 | Jacobson .................................. 99/519 |
| 3,561,515 | 2/1971 | Nahm, Jr. .................................. 99/519 |
| 3,845,704 | 11/1974 | Zhislin et al. ............................ 99/519 |
| 5,511,469 | 4/1996 | Satake et al. ............................. 99/519 |

FOREIGN PATENT DOCUMENTS

| | | |
|---|---|---|
| 1086690 | 5/1994 | China . |
| 641.741 | 8/1928 | France . |
| 1.075.326 | 10/1954 | France . |
| 1.517.152 | 2/1968 | France . |
| 22094413 | 9/1973 | Germany . |
| 352-502 | 9/1976 | U.S.S.R. . |

*Primary Examiner*—Reginald L. Alexander
*Attorney, Agent, or Firm*—Pearne, Gordon, McCoy & Granger llp

[57] ABSTRACT

An apparatus for separating outer layers or shells from the internal seed of plant matter comprises a plant matter inlet (12), a seed outlet (14) and a generally vertical separating chamber (16) interposed between the inlet and outlet. The separating chamber is cylindrical and includes a plurality of axially spaced apart inwardly facing nozzles (18) and a plurality of spaced apart apertures (20). The apertures are a size smaller than the seeds being separated to allow only the outer layer or shells to pass therethrough. A separating chamber includes a plurality of inclined to horizontal baffles (21) to increase the residence time in the plant matter in the chamber.

28 Claims, 1 Drawing Sheet

APPARATUS FOR SEPARATING THE OUTER LAYERS OR SHELLS FROM THE INTERNAL SEED OF PLANT MATTER

TECHNICAL FIELD

The present invention relates to an apparatus for separating the outer layers or shells from the internal seed of plant matter.

The invention has been developed primarily for use in separating the outer flesh from the seed of fruit or separating the inner seed or kernel from the outer shells of nuts and will be described hereinafter with reference to these applications. However, it will be appreciated that the invention is not limited to these particular fields of use and is equally suited to separating the outer layers and internal seeds of many different plant varieties as well as removing the outer layers from the internal wood of stems, branches and trunks of trees, bushes and plants. Examples of the latter include the recovery of outer layers, or bark, of certain woody plants for use as a tanning ingredient for leather processing, as a spice ingredient for cinnamon and as a medical ingredient for the quinine drug. Alternatively, the internal wood is recovered for many commonly known purposes. Other examples where the invention has particular application include coconut-in-husk, macadamia nuts-in-husk, alfalfa (lucerne) seed-in-pod, coffee bean-in-fruit, coffee bean-in-husk and coffee bean-in-pod.

Hitherto, separating and decorticating apparatus have relied upon one or more of a rubbing, beating, grinding and/or impacting action to remove the outer layers or shells from the internal seeds of plant matter by some mechanical means. For example, known apparatus employ metallic or ceramic material components to confine and impact the plant matter with rotating, reciprocating, or oscillating motion to effect the separation or decortication. This attrition often results in the internal seed being bruised or otherwise damaged, reducing its value. Moreover, these apparatus are noisy and dusty to operate, generate large amounts of heat due to friction, and are therefore inefficient and wasteful of energy. Moreover, like all mechanical attrition devices, the known apparatus are particularly subject to mechanical failure and wear and tear.

DISCLOSURE OF THE INVENTION

It is an object of the present invention to overcome or substantially ameliorate at least one of these deficiencies of the prior art.

According to a first aspect of the invention there is provided an apparatus for separating the outer layer or shells from the internal seed of process matter, the apparatus including:

a process matter inlet;

a separating chamber for receiving process matter from said inlet, said chamber including one or more separating apertures therein, the or each of said apertures being smaller than the seed;

an outlet for allowing removal of said seed from the chamber;

a nozzle which, in use, directs a pressurised fluid to impact said process matter in said chamber and to separate the outer layers or shells from the seed such that a majority of the outer layers or shells are forced through said one or more apertures and a majority of the seeds pass to said outlet.

Preferably, the process matter is plant matter.

Preferably, the fluid is a liquid for piercing and/or lancing the outer layers or shells. Alternatively, or in addition to, the fluid may be a gas adapted to expand upon entry to the separating chamber so as to cool the plant matter. Furthermore, alternatively, or in addition to, the fluid may be a gas dissolved in a liquid adapted to initially penetrate and pierce the outer layers or shells wherein the expending gas explodes the outer layers or shells away from the internal seed in addition to cooling and facilitating flushing away the separated outer layers or shells.

More preferably, the apparatus includes a plurality of nozzles to propel the liquid, the gas, the gas dissolved in the liquid or any combination thereof into the chamber.

In a preferred embodiment, the apparatus includes a collecting chamber adjacent the separating chamber adapted to collect the separated outer layers or shells passed through the apertures. The collecting chamber preferably includes at least one outlet for the outer layers or shells.

In another preferred embodiment, the plant matter inlet includes a metering means adapted to control the flow of plant matter into the separating chamber. The metering means may include hopper having a number of discrete delivery compartments which are sequentially connected to the plant matter inlet.

In a preferred form the chamber includes a wall having the separating apertures extending therethrough, wherein the plant matter in the chamber is disposed between said nozzle and said wall and said fluid is directed by said nozzle toward said wall.

Preferably, the wall is cylindrical and a plurality of axially and circumferentially offset nozzles are used. More preferably, the axis of said wall is substantially vertical and the plant matter moves from the inlet at the top of the wall to the outlet at the bottom of the wall.

Preferably also, the wall is a steel sheet having an array of separating apertures formed therein. Alternatively, the wall is a mesh screen.

In a preferred form the collecting chamber is cylindrical and coaxially disposed with respect to said separating chamber. More preferably, the collecting chamber axially surrounds the separating chamber and the nozzle or nozzles are inwardly directed, whereby the outer layers or shells are forced outwardly through the one or more apertures and into the collecting chamber.

According to a second aspect of the invention there is provided a method for separating the outer layer or shells from the internal seed of process matter, including the steps of:

introducing the process matter into a chamber which includes one or more separating apertures which are smaller than the seed;

providing an outlet means for removal of the seeds from the chamber, and directing a pressurised fluid to impact said process matter in said chamber and to separate the outer layers or shells from the seed such that a majority of the outer layer or shells are forced through the one or more apertures and a majority of said seeds pass to said outlet.

Preferably, the process matter is plant matter.

According to a third aspect of the invention, there is provided a plant product produced by the apparatus or the method as described above.

The plant product may be the outer layers or shells, the internal seed or both.

BRIEF DESCRIPTION OF THE DRAWING

A preferred embodiment of the invention will now be described, by way of example only, with reference to the accompanying drawing in which.

MODES FOR CARRYING OUT THE INVENTION

Figure 1:
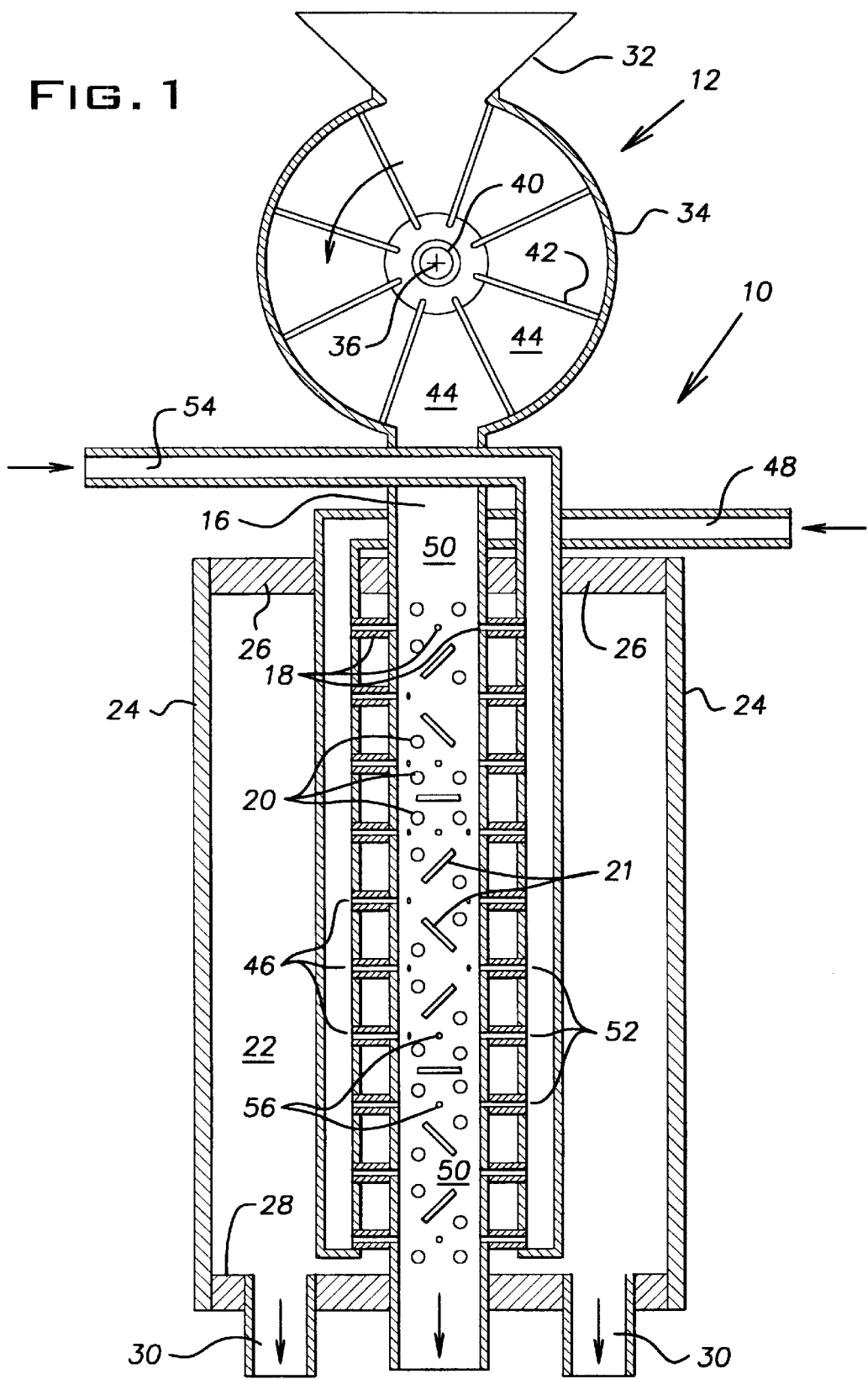
FIG. 1 is a schematic sectional side view of an apparatus according to the invention.

Referring to the drawing there is illustrated an apparatus 10 for separating the outer layers or shells from the internal seed of plant matter. Apparatus 10 includes a plant matter inlet 12 and a generally vertical cylindrical separating chamber 16 for receiving plant matter from inlet 12.

Separating chamber 16 includes a wall which supports a plurality of axially and circumferentially spaced apart inwardly facing nozzles 18. The wall also includes a plurality of spaced apart apertures 20 which are smaller than the seed being separated from the plant matter. The separating chamber also includes a plurality of alternating inclined and horizontal baffles 21 to increase the residence time of the plant matter in the chamber as it moves downwardly under the influence of gravity.

A cylindrical collecting chamber 22 is provided external to chamber 16 and is arranged to be coaxial therewith. Chamber 22 includes a circumferential wall 24, a top 26 and a base 28. The base includes a plurality of spaced apart outlets 30 to allow removal of the outer layers or shells collected in chamber 22.

Inlet 12 includes a hopper 32 and metering device 34. The metering device is cylindrical, and has a substantially horizontal axis 36 along which extends on axle 40. The axle supports a plurality of radially diverging plates 42 which defined chambers 44 therebetween to provide sequential fixed volume doses of plant matter to separating chamber 16 as the axle is rotated in an anticlockwise direction. It will be appreciated that the axle may be rotated in either direction.

In the embodiment shown, there are three arrays of nozzles arranged approximately equally spaced about the periphery of the separating chamber. The first array 46 is provided with a high pressure liquid, such as water, from conduit 48 which is directed by the respective nozzles into chamber interior 50. A second column 52 is used to propel a high pressure gas, such as air, from conduit 54 into chamber interior 52. A third column 56 is used to propel a gas dissolved in a liquid from a third conduit (not shown) into chamber interior 50.

Many different liquids and gases may be used as the separating fluid. If a food product is being produced it is advantageous to incorporate fillers, binders, sweeteners or other additives into the fluid used to separate the outer layers or shells from the seed to reduce subsequent processing steps.

The wall defining chamber 16 is shown produced from sheet steel which is machined to provide apertures 20 and the nozzles. In alternative embodiments, however, the wall is a wire mesh.

In use, plant matter is sequentially introduced into chambers 44 of the inlet 12 via hopper 32. Axle 40 is rotated by drive means (not shown) to progress plates 42. As the plates reach the low point of their travel the plant matter moves under the influence of gravity into the chamber 16. The residence time of the plant matter through the chamber is adjusted by the use of baffles 21 which the plant matter impacts. As the plant matter travels through chamber 16 the outer layers or shells are pierced and lanced away from the internal seed by the high pressure jets of fluid from the three arrays of nozzles. It is believed that the majority of the piercing and lancing is performed by the jets of water and aided somewhat by the jets of gas and the jets of the gas entrained in the fluid. Furthermore, the expansion of the gas after leaving the second array of nozzles aids cooling of the plant matter. This is particularly advantageous if a food product is being prepared that requires refrigeration. The high pressure fluid leaving the jets also serves to force the separated outer layers or shells through apertures 20 into collecting chamber 22 and through outlets 30 for collection. As the apertures are sized to be smaller than the seeds, the seeds do not pass through them and continue downwardly through chamber 16 until ultimately exiting outlet 14.

By adjusting the flow rate, pressures, pulsing, type and properties of the liquids and gases used the apparatus can be optimised depending on the plant matter being processed. For example, relatively lower pressures and higher residence times are used in situations where delicate seeds are being collected, such as in coffee and nuts. However, relatively high pressures are used to separate the outer flesh of, for example, an apricot from the robust seed.

If desired, a further chamber using only gas nozzles are used to dry the seeds after separation. This is advantageous when packaging of the seeds occurs after they are removed from the separating chambers.

To increase throughput the apparatus can be configured in multiple banks. The apparatus can also be produced in different sizes and shapes depending on the application.

This preferred embodiment employs, without mechanical moving parts, the forces of pressurised fluids which are directed through nozzles toward the plant matter within the confines of a separating chamber. The chamber includes apertures to allow the discharge of smaller broken-up outer layers or shell fragments while the larger intact seeds remain to exit through the end of the chamber. Although the separating chamber is shown in a vertical configuration with the plant matter progressing downwardly through that chamber, depending upon the nature of the plant matter and the seed, other embodiments include a separating chamber which is inclined or horizontal. Moreover, in other alternative embodiments the plant matter and seed moves upwardly, propelled by the pressurised fluid.

It will be appreciated that there are many types, sizes and shapes of nuts-in-shell, seeds-in-husk and stones-in-fruit which vary with ripeness, maturity, climatic variation and plant varieties. There are also vast difference in the texture, resilience and hardness of the outer shell, skin, husk or cortex as there is with the internal fruit, and with the internal seed. Accordingly, the fluid pressures are adjusted for the particular application of the invention.

In some cases the seed or kernel is the product sought and in other cases it is the fruit or fruit pulp, leaving the seed and sometimes the skin as by products or waste. In these applications it is the material collected in the collecting chamber that is used to produce the end product rather than the seed matter.

Frequently decorticating is carried out before, after and/or in conjunction with drying and/or wetting, heating blanching, roasting, cooking, freezing or steaming of the plant matter. Where required these ancillary processes are carried out in an extension of the separating chamber or additional separating chambers. In such embodiments, special fluid injecting nozzles constructed of cold or heat resistant materials inject cold or hot fluids at varying temperatures, volumes, velocities and pressures through the extended or additional separating chamber and toward the plant matter being passed therethrough.

The condition and type of plant matter being processed will also dictate the type of feed metering apparatus to be used.

In some embodiments the separating chamber wall is a stator and includes a helical screw extending therethrough which is, in effect, a rotor. The rotor facilitates and regulates the progression of the plant matter through the separating chamber. Other alternative embodiments utilise either an auger rotor, a helical screw rotor, a fork pronged rotor, or a plain or tapered cylindrical rotor. Such rotors preferably have arrays of high pressure liquid and/or gas nozzles associated therewith and configured to direct to effectively decorticate and/or demucilage the plant matter.

Additionally, the stator may have a single, double, or triple start screw threadlike surface complementary with the rotor periphery. Preferably, this surface assists in the turning, agitating and decorticating of plant matter moving through the separating chamber.

The stator can include an array of high pressure liquid and/or gas nozzles to assist in the turning, agitating, decorticating and/or demucilaging of the plant matter moving over its surfaces.

One example of plant matter processed in one embodiment of the invention is a Papua New Guinea variety of Arabica coffee cherry of average ripeness. The coffee cherry is initially fed and metered through a single screw pump and passed into the separating chamber. Here the cherry is impacted by pressurised and filtered ambient temperature water provided by a first pair of diametrically opposed rows of high pressure nozzles. Preferably, the nozzles include respective fluid openings through which the water passes through to enter the chamber. More preferably, the openings have a diameter in the range of 0.025 mm and 0.075 mm. More preferably, the nozzles are a straight jet design operating in a pressure range of 4,000 to 10,000 psi. As will be appreciated by one skilled in the art, the actual pressure used is dependent upon the ripeness of the coffee cherry.

A second pair of diametrically opposed rows of high pressure nozzles are also disposed in the separating chamber, and are offset 60° to respective rows of the first pair. Preferably, the second rows of nozzles propel filtered ambient temperature air into the chamber through fluid openings with diameters in the range of 0.0125 mm and 0.050 mm. Again, these nozzles are preferably straight jet design and operating in the pressure range of 5,000 to 9,000 psi.

In embodiments where the coffee cherry is also impacted by a fluid including a gas dissolved in a liquid, it is preferred that the fluid includes pressurised filtered ambient air dissolved in similarly treated water. In such an embodiment the apparatus includes a third pair of diametrically opposed rows of high pressure nozzles which are offset 60° to each of the other pairs of rows of nozzles. Preferably, the third pairs include fluid openings in the size range of 0.025 mm and 0.075 mm. More preferably, the third pairs of nozzles are of similar design and of similar pressure rating to the second pairs.

In the embodiment discussed above for the processing of coffee cherries the separating chamber preferably is cylindrical and has a diameter of 22 mm and a length of 200 mm. The chamber preferably also includes an array of apertures of 4.5 mm diameter and other aperture slots 10 mm long by 2.0 mm width for the discharge of separated cherry skin and mucilage adhering to the remaining so called wet demucilaged coffee parchment.

In other preferred embodiments a plurality of separating chambers are used. In one particularly preferred embodiment fifty five parallel spaced apart separating chambers are used, all the separating chambers extending through a single collecting chamber. As will be appreciated by those skilled in the art, the separating chambers need not be circular or concentric with the collection chamber.

The cherry throughput of the specific embodiment discussed above ranges between 250 kg and 500 kg per hour per separating chamber.

Although the invention has been described with reference to a specific example, it will be appreciated by those skilled in the art that the invention may be embodied in many other forms. For example, the invention can be used to remove foreign coatings from seeds or other matter.

What is claimed is:

1. An apparatus for separating the outer layer or shells from the internal seed of process matter, the apparatus including:
   a process matter inlet;
   a separating chamber for receiving process matter from said inlet, said chamber including one or more separating apertures therein, the or each of said apertures being smaller than the seed but permitting a majority of the outer layer or shells to pass therethrough;
   an outlet for allowing removal of said seed from the chamber;
   a nozzle which, in use, directs a pressurised fluid to impact said process matter in said chamber and to separate the outer layers or shells from the seed such that a majority of the outer layers or shells are forced through said one or more apertures and a majority of the seeds pass to said outlet.

2. An apparatus according to claim 1 wherein the fluid includes a liquid for piercing and/or lancing the outer layers or shells.

3. An apparatus according to claim 1 wherein the fluid includes a gas adapted to expand upon entry to the separating chamber to cool the plant matter.

4. An apparatus according to claim 1 wherein the fluid includes a gas dissolved in a liquid adapted to both initially penetrate and pierce the outer layers or shells wherein the expanding gas: explodes the outer layers or shells away from the internal seed; cools the plant material; and facilitates flushing away the separated outer layers or shells.

5. An apparatus according to claim 1 including a plurality of nozzles to propel the fluid into the chamber.

6. An apparatus according to claim 1 including a collecting chamber adjacent the separating chamber for collecting the separated outer layers or shells passed through the at least out aperture.

7. An apparatus according to claim 6 wherein the collecting chamber includes at least one outlet for the outer layers or shells.

8. An apparatus according to claim 1 wherein the process matter inlet includes a metering means adapted to control the flow of plant matter into the separating chamber.

9. An apparatus according to claim 8 wherein said metering means includes a hopper having a number of discrete delivery compartments which are sequentially connected to said separating chamber.

10. An apparatus according to claim 1 wherein said separating chamber includes a wall having the separating apertures extending therethrough, wherein the plant matter in the chamber is disposed between said nozzle and said wall and said fluid is directed by said nozzle toward said wall.

11. An apparatus according to claim 10 wherein the wall is cylindrical and a plurality of axially and circumferentially offset nozzles are used.

12. An apparatus according to claim 11 wherein the axis of said wall is substantially vertical and the process matter moves from the inlet at the top of the wall to the outlet at the bottom of the wall.

13. An apparatus according to claim 12 wherein the wall is a steel sheet having separating apertures formed therein.

14. An apparatus according to claim 12 wherein said wall is a mesh screen.

15. An apparatus according to claim 6 wherein said collecting chamber is cylindrical and coaxially disposed with respect to said separating chamber.

16. An apparatus according to claim 15 wherein said collecting chamber axially surrounds the separating chamber and the nozzle or nozzles are inwardly directed, whereby the outer layers or shells are forced outwardly through the one or more apertures and into the collecting chamber.

17. An apparatus according to claim 1 wherein said process matter is plant matter.

18. A method for separating the outer layer or shells from the internal seed of process matter, including the steps of:

introducing the process matter into a chamber which includes one or more separating apertures which are smaller than the seed but which permit a majority of the outer layers or shells to be passed therethrough;

providing an outlet means for removal of the seeds from the chamber;

directing a pressurised fluid to impact said process matter in said chamber and to separate the outer layers or shells from the seed such that a majority of the outer layers or shells are forced through the one or more apertures and a majority of said seeds pass to said outlet.

19. A method according to claim 18 wherein the separating chamber includes a plurality of the nozzles and/or plurality of the apertures.

20. A method according to claim 18 wherein the fluid is a liquid for piercing and/or lancing the outer layers or shells.

21. A method according to claim 18 wherein said fluid is a gas which expands upon entry into the separating chamber to cool the process matter.

22. A method according to claim 18 wherein said fluid is a gas dissolved in a liquid adapted to initially penetrate and pierce the outer layers or shells wherein the expanding gas explodes the outer layers or shells away from the internal seed in addition to cooling and facilitating flushing way the separated outer layers or shells.

23. A method according to claim 19 wherein the nozzles propel any one or more of the following classes of fluid: the liquid, the gas; the gas dissolved in a liquid; or any combination thereof.

24. A method according to claim 22 including the step of collecting the separated outer layers or shells passed through the apertures within a collecting chamber adjacent the separating chamber.

25. A method according to claim 24 wherein the collecting chamber includes at least one outlet for the outer layers or shells.

26. A method according to claim 22 including the step for controlling the flow of the process matter into the separating chamber by way of metering means.

27. A method according to claim 26 wherein the metering means includes a number of discreet delivery compartments and the method includes the step of sequentially connecting those compartments to the separating chamber.

28. A process according to claim 18 wherein the process matter is plant matter.

* * * * *